(12) United States Patent
Blot et al.

(10) Patent No.: US 9,010,395 B2
(45) Date of Patent: Apr. 21, 2015

(54) METHOD AND DEVICE FOR THE AUTOMATED PRODUCTION OF DRY FIBROUS PREFORMS

(75) Inventors: Philippe Blot, Nantes (FR); Christophe Marchand, Reze (FR); Claude Le Bail, Coueron (FR); Simon Deseur, Bayonne (FR); Jerome Soto, Nantes (FR)

(73) Assignee: Airbus Operations S.A.S., Toulouse (FR)

( * ) Notice: Subject to any disclaimer, the term of this patent is extended or adjusted under 35 U.S.C. 154(b) by 206 days.

(21) Appl. No.: 13/499,414

(22) PCT Filed: Sep. 30, 2010

(86) PCT No.: PCT/FR2010/052067
§ 371 (c)(1),
(2), (4) Date: Sep. 10, 2012

(87) PCT Pub. No.: WO2011/039484
PCT Pub. Date: Apr. 7, 2011

(65) Prior Publication Data
US 2012/0328846 A1 Dec. 27, 2012

(30) Foreign Application Priority Data
Oct. 1, 2009 (FR) .................................. 09 56871

(51) Int. Cl.
*B29C 43/18* (2006.01)
*B32B 37/10* (2006.01)
(Continued)

(52) U.S. Cl.
CPC ................. *B29C 70/38* (2013.01); *B29B 11/16* (2013.01); *B29C 70/222* (2013.01);
(Continued)

(58) Field of Classification Search
CPC ........ B29C 43/18; B29C 60/34; B30B 15/34; B32B 3/04; B32B 31/20; B32B 37/10; B32B 37/20; B32B 38/00; B32B 38/08; B32B 5/12; B65H 81/00
USPC .................. 156/459, 461, 581, 583.1, 583.3, 156/583.91; 425/374, 383, 394, 508, 509
See application file for complete search history.

(56) References Cited

U.S. PATENT DOCUMENTS 5,022,952 A * 6/1991 Vaniglia ........................ 156/441
2001/0007684 A1 * 7/2001 Kasai et al. .................... 425/224
(Continued)

FOREIGN PATENT DOCUMENTS

| FR | 2 920 743 | 3/2009 |
| WO | 99 15323 | 4/1999 |
| WO | 2009 097514 | 8/2009 |

OTHER PUBLICATIONS

Gay, D., "Materiaux composites," Hermes, pp. 56-59, (1997).
International Search Report Issued Mar. 11, 2011 in PCT/FR10/52067 Filed Sep. 30, 2010.
U.S. Appl. No. 13/497,136, filed Mar. 20, 2012, Blot, et al.

*Primary Examiner* — George Koch
(74) *Attorney, Agent, or Firm* — Oblon, McClelland, Maier & Neustadt, L.L.P.

(57) ABSTRACT

A device for laying up a dry preform having an elongated shape includes a punch that reproduces the elongated shape of the dry preform, a depositing assembly, and a mobile carrier that moves at least one of the punch and the depositing assembly. The depositing assembly deposits, onto the punch, a fibrous band including a small amount of binding agent to make up the dry preform having a cross-section with at least two non-coplanar wings. The depositing assembly also includes pressing devices that press the fibrous band, a channel that pre-shapes the fibrous band to have the cross-section, and a calibration device that applies a normal pressure to all surfaces of the dry preform that are opposite from the punch while cooling the pressed portion of the fibrous band to control a thickness of the dry preform having the cross-section.

9 Claims, 5 Drawing Sheets

(51) Int. Cl.
  *B29C 70/38* (2006.01)
  *B29B 11/16* (2006.01)
  *B29C 70/22* (2006.01)
  *B29K 105/00* (2006.01)
  *B29L 31/00* (2006.01)
  *B29L 31/30* (2006.01)

(52) U.S. Cl.
  CPC .... *B29K 2105/253* (2013.01); *B29L 2031/003* (2013.01); *B29L 2031/3082* (2013.01); *Y02T 50/433* (2013.01); *Y02T 50/43* (2013.01)

(56) References Cited

U.S. PATENT DOCUMENTS

| | | | |
|---|---|---|---|
| 2003/0205334 A1* | 11/2003 | Sherrill et al. | 156/581 |
| 2007/0052126 A1* | 3/2007 | Chiba et al. | 264/109 |
| 2007/0126142 A1* | 6/2007 | Zhou et al. | 264/134 |
| 2009/0050263 A1* | 2/2009 | Suzuki et al. | 156/245 |
| 2010/0024971 A1 | 2/2010 | Benson et al. | |
| 2010/0109185 A1* | 5/2010 | Ogawa et al. | 264/177.19 |
| 2010/0308165 A1 | 12/2010 | Markowski et al. | |

* cited by examiner

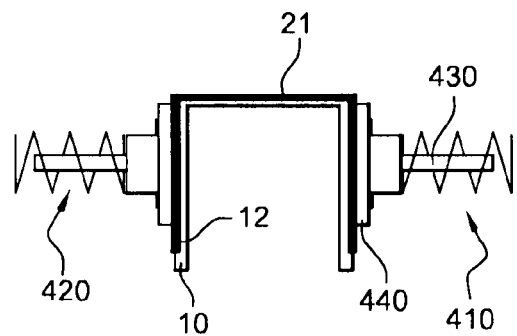
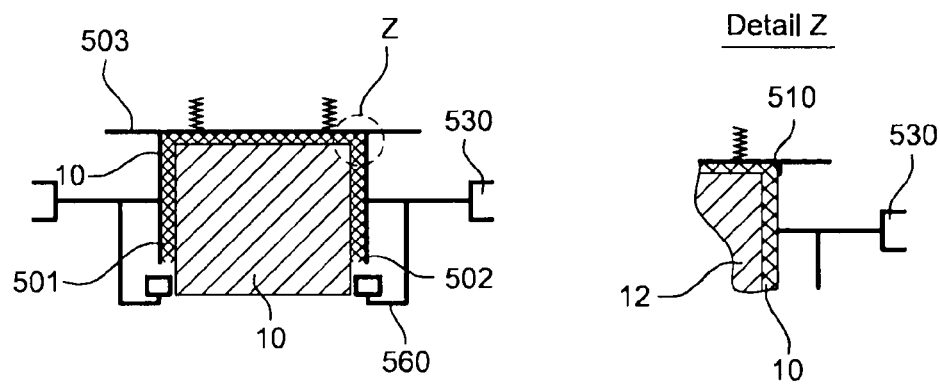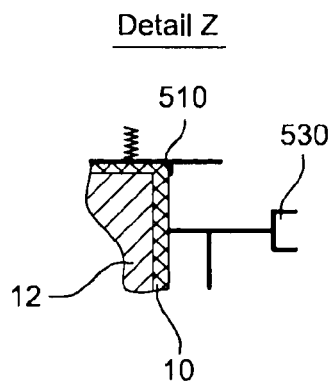
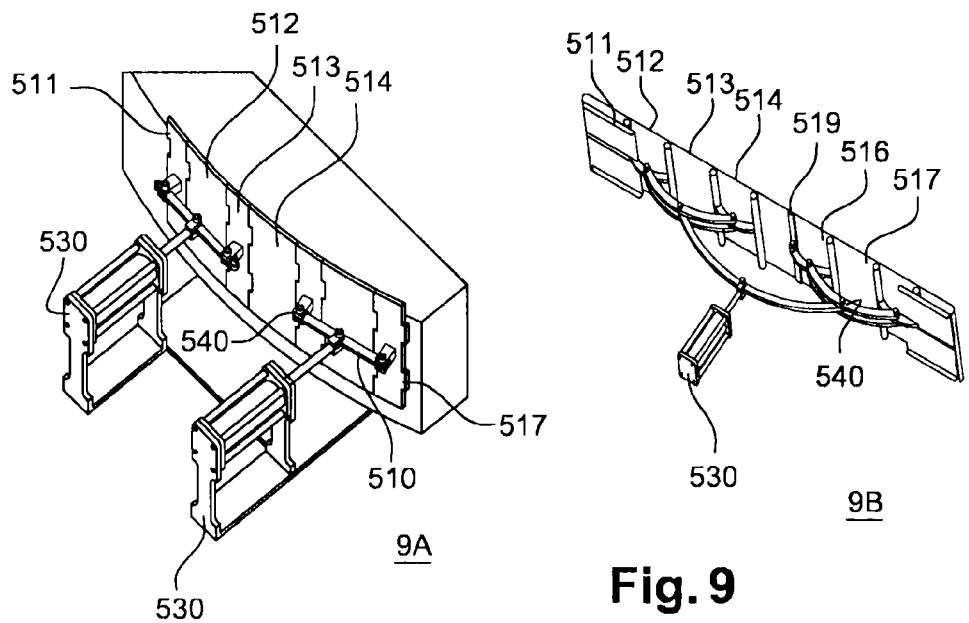

METHOD AND DEVICE FOR THE AUTOMATED PRODUCTION OF DRY FIBROUS PREFORMS

This application is a national stage entry of PCT/FR10/52067, filed on Sep. 30, 2010.

The invention relates to a device and a method for the manufacture of elongated textile preforms intended for manufacturing load-bearing composite members by means of a method using resin infusion.

Such preforms are called "dry" and only comprise a small amount of binding agent, usually less than 5%, which is necessary to maintain the cohesion of said preform, which must nevertheless remain porous enough to allow the resin to impregnate it completely during the infusion operation.

More specifically, the device and the method, which are the subjects of the invention, are designed for manufacturing substantially circular preforms, intended, for example, for the realization of aircraft fuselage frames or segments of frames.

Such a load-bearing member comes in the form of a section, whose substantially constant cross-section may be generally L-, U-, Z-shaped or have a more complex shape, said cross-section extending along a longitudinal axis describing any plane curve, over a length greater than 10 times the width of the cross-section.

The cross-section of such a section comprises at least two non-coplanar wings. In the case of a substantially circular member, such as a fuselage frame, at least one of the two wings has a radius of curvature variation along its width. Typically the average radius of curvature is 20 times greater than the width. The cross-section of the member can be widened locally, more specifically in the radial direction, to realize splices.

Such load-bearing members are obtained from fibers stacked according to specific orientations and a specific stacking sequence. An example of such a section is described in the French patent application FR2920743 in the name of the applicant.

According to an example of realization, such a section is obtained by placing a preform consisting of a plurality of dry fiber layers with a specific orientation, or plies that reproduce substantially the shape of the final member in the imprint of a sealed mold. Then, the fibers are sunk into the resin by transfer or infusion of resin in the preform and lastly the preform is cured to polymerize said resin.

According to the prior state of the art, obtaining the preform requires manual operations that consist in depositing the various plies on a template, punch, or matrix tool that reproduces substantially the shape of the part. The fibers are deposited in bands in the form of non-woven tapes, fabric or multiaxial stacks. The operator forces said bands to adopt the shape of the tool both as to cross-section and longitudinal profile without inducing either wrinkling or rippling of the fibers, failing which, the mechanical characteristics of the final part would decrease. However, fibers such as carbon or glass fibers show no ability for plastic deformation. While depositing, the operator must be careful to maintain a substantially constant and uniform tension in the different layers deposited, to make them adopt the shape of the tools by the controlled variation of the distance and slippage between the fibers without wrinkling.

This operation, which consists of pressing and tensioning in controlled manner a fibrous preform consisting of continuous fibers on a tool, is conventionally called "flaring".

Maintaining the cohesion of the preform is realized by thermally activating the small amount of binding agent contained in the deposited bands by heating these locally. This heating has the effect of fluidizing said small amount of binding agent that permeates the fibers in contact. This fluidization is generally accompanied by an expansion of the binding agent, whose volume increases; this expansion is maintained by pressure. The at least partial polymerization of the binding agent fixes the layers to one another and to the tool. As a general rule, during manual layup operations, the operator simply welds the plies locally to one another by points or along lines. Then, once all the X plies have been deposited (4 or 5 in general), the preform is compacted while hot by a vacuum bag type device.

This manual operation requires dexterity on the part of the operator, involves significant handling time and specific means to install the compaction devices and therefore leads to high production costs. This production method therefore remains limited to the manufacture of parts in small volumes.

Automated or partially automated layup methods of the prior state of the art for realizing elongated preforms are known. These are mainly suitable for realizing preforms from bands pre-impregnated with thermosetting resin in their uncooked state. Such bands are tacky and easily maintain themselves in the form of a compact stack on the tool without requiring a particular cycle of compaction pressure-temperature.

Patent EP0436415 describes a device for forming elongated circular preforms mainly from pre-impregnated bands, which are flared onto a tool by the gradual action of a bladder. The device described in this patent is difficult to adapt to large-size parts such as fuselage frames for wide-body airplanes.

In addition, this device does not allow the shape of a dry preform made of non-tacky bands after the bladder's action has been released.

International application WO2005/011961 describes a method and a device for laying up elongated preforms. This device uses rollers to tension, press and compact the bands deposited on a tool. This device is not suitable for depositing dry bands that comprise a small quantity of binding agent. It does not have welding means and means to apply the compaction heat cycle. The compaction pressure is applied to the cold band as it is deposited, using a roller.

In the case of a dry fiber band, applying pressure along a generatrix of this roller does not allow a sufficient length of band to be maintained on the tool to avoid any wrinkling of the latter during the flaring action. By multiplying the number of rollers in the form of a train to eliminate this drawback, these last create, by their rolling action, wrinkling of the fibers, particularly when the thickness of the dry preform, which is, in addition, porous, becomes large. However, such wrinkles are highly detrimental to the mechanical characteristics of the parts thus obtained.

Lastly, the rolling action does not allow a suitable cycle of local pressure-temperature to be applied at the time of depositing. In effect, the fluidization and expansion of the binding agent, combined with the action of the rollers, lead to a local wringing out of the binding agent in the plies on which the rollers roll and to the creation of clumps of binding agent in the preform, which clumps are also detrimental to the quality of the final part.

There is therefore a need for a method and for a device that allow elongated fibrous preforms to be realized from continuous fibers containing a small quantity of binding agent, suitable for mass-production and whose manufacturing quality is not dependant on the skill of the operator.

In order to solve the shortcomings of the prior state of the art, the invention provides a method for depositing a fibrous band gradually and continuously over the length of an elongated shape, which comprises a small amount of binding agent to make up a so-called dry preform whose cross-section comprises at least two non-coplanar wings comprising steps that consist of performing the following sequentially and in the following order:

heat a portion of said band so to activate the small quantity of binding agent;

press said portion on one of the surfaces of the preform;

pre-shape the portion while hot to the cross-section of the preform;

roller-press the portion onto the surfaces of the preform while hot;

while it is cooling, calibrate the stack comprising the portion thus deposited by applying pressure to all the corresponding surfaces of the preform;

these steps are applied sequentially to a given portion but they are carried out simultaneously at the level of the band on successive portions so as to realize continuous depositing. The continuity of this depositing is essential to flare the band according to the curvature of the preform or along variations in width of the latter.

The bands of fibers thus deposited can be non-woven fabrics or tapes or even of the multi-axials comprising fibers oriented at an angle θ in relation to the longitudinal axis of the preform and/or of fibers oriented at 90° in relation to this axis. Typically, θ is between 30° and 60°. These continuous fibers extend over at least two non-coplanar wings of the cross-section of the preform.

Thus the method according to the invention uses gradual depositing along a direction substantially parallel to the longitudinal axis of the preform and gradual and continuous compaction/calibration of the fibrous band on the preform. This continuous depositing and local compaction allow the prior state of the art's handling time of the vacuum-bag type of compaction means to be eliminated.

Such a method cannot be implemented by manual layup; this is why the invention also relates to a device for implementing the method according to the invention, which device comprises:

a punch that reproduces the shape of the preform;

means of depositing able to deposit, roller-press and calibrate a fibrous material band comprising a small amount of binding agent on the preform; said means comprise a channel for preforming the band to the cross-section of the preform;

means of relative movement of the means of depositing along the punch;

the relative movement of the means of depositing along the punch allows the bands to gradually deposited, compacted and calibrated on the preform. Either the punch can be mobile and move in relation to the fixed means of depositing or vice versa.

Preforming the band by gradually bringing the band closer to the surfaces of the preform avoids any wrinkling of the band while it is being roller-pressed, in re-entrant angles in particular, and allows said roller-pressing to be realized by pads, whose surface is elastic and substantially deformable under the contact pressure, which apply the roller-pressing pressure to a surface substantially parallel to the side of the preform, thus avoiding wrinkles and wringing phenomena.

Advantageously, the preforming channel comprises two separate parts, which can move in relation to each other and means designed to move said parts so as to adapt the preforming cross-section to variations in section of the punch and/or of the preform. This layout allows the same preforming channel to be used for a series of homothetic preforms with substantially equivalent cross-sections but different dimensions; preforms to be realized with variations of cross-section along their lengths, in particular, radial enlargements; and the thickness of the deposited layer to be adjusted, in particular when the layup is performed in several passes of the punch under the means of depositing.

Advantageously, the punch is made of a porous or perforated material. This characteristic reduces the thermal inertia of the punch and thus reduces the preform's heating/cooling time, which time has a direct influence on the productivity of the method. In a non-limiting example, the punch may consist of a perforated plate or of a grille. This configuration advantageously allows the preform, which itself is porous, to be cooled by blowing heat-transfer gas through the walls of the punch. According to a preferred embodiment, the means roller-pressing comprise pads, whose contact surface with the preform is elastic and deformable under the action of the contact pressure. The latter work together with the preforming channel to bind the band onto the section of the preform. The friction of the pads tightens the band and realizes its flaring.

Still according to a preferred embodiment, the calibration is carried out by the pads made of plates, whose contact surface with the preform is rigid, said plates being articulated between one another. These calibration pads come into play during the cooling of the preform. The calibration plates produce a compaction and calibration action on the stack, to calibrate the thickness of the preform to a predefined value. The articulated assembly of plates allows this calibration pressure to be applied onto a surface substantially parallel to the surface of the punch and the set of plates to adjust to the shape of this surface.

The plates may be thick and rigid, more specifically when the preform is straight or has a smaller curvature. Alternatively, when the preform has smaller radii of curvature, said plates can have some flexibility to adopt the curvature; the contact surface with the preform remains hard and rigid.

Advantageously, the depositing device comprises a device to locate the section of the punch in relation to the means of depositing during their relative movement. Such a device makes it possible to work by copying and to control the orientation of the deposited band as well as the roller-pressing and calibration means by following the actual section of said punch.

In order to install local reinforcements, the means of depositing advantageously comprise a device to cut the band along its width. The information delivered by the location of the section of the punch allows the position of these reinforcements to be located accurately.

Preferably, the punch is arranged on a mobile table and the means of depositing are placed on a fixed table; synchronized automatic advance means are used to move the punch under the means of depositing.

Advantageously, such a device also comprises means of depositing bands of fibers that extend parallel to the longitudinal axis of the preform on the surfaces of the cross-section that have no variation in their radius of curvature along their width. Such bands are heated before depositing to activate the binding agent and preferably pressed against the preform by the calibration pads.

Such a device makes it possible to manufacture economically and in a reproducible way the fibrous preforms intended for the realization of composite parts such as aircraft fuselage frames.

The invention will now be described more precisely in the context of preferred non-limiting embodiments shown in FIGS. 1 to 11 in which:

FIG. 7 is a cross-section view of the application of the roller-press pads on the preform according to an embodiment suited to the realization of a U-shaped preform cross-section;

FIG. 8 is a cross-section view of the application of the calibration pads according to an embodiment that corresponds to a U-shaped preform cross-section;

FIG. 9A shows in a perspective top view an example of application of the calibration plates on one of the sides of the preform;

FIG. 9B is an alternative example of realization of the device for applying the preforming plates on the preform;

Figure 1:
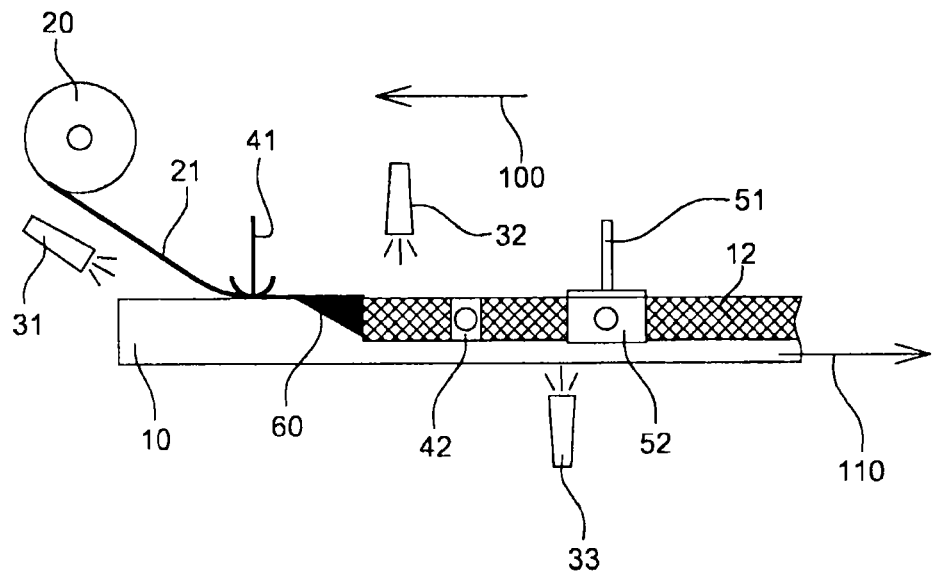
FIG. 1 is a schematic side view of an embodiment of the depositing device.

FIG. 1, The depositing device consists of means of storing (20) bands of material comprising a small amount of binding agent, means of roller-pressing (41, 42), a preforming channel (60), means of calibration (51, 52), means of heating (31, 32), preferably by blowing hot air and cooling means (33), preferably by blowing cold air.

The band of fibrous material (21) is preferably stored on a reel (20). Said reel is unwound at a substantially constant speed; its speed of rotation can be advantageously synchronized with the relative speed of travel (100, 110) of the depositing device in relation to the punch (10) so as to control the longitudinal tension.

A device for heating by blowing hot air (31) blows in air heated to a temperature able to activate a small amount of binding agent contained in the band (21) and thus encourage the adhesion of said band on the preform. The activation temperature is generally between 100° C. and 180° C. for thermosetting resin, it can reach 300° C. for some thermoplastic resins.

The binding agent is incorporated into the matter to be deposited prior to the depositing operation. This incorporation is realized by dusting thermoplastic or thermosetting resin, via a thermoplastic film co-laminated with the fibrous band, in the form of thermoplastic fibers incorporated in the reinforcing fiber band or in reinforcing fibers having been fitted with thermoplastic sheathing.

The band is pressed against one of the sides of the punch (10) by a first roller-pressing pad (41). A channel (60) then folds the edges of said bands (21) over the flanks of the punch.

A second heating device (22) pointed toward the flanks of the punch heats the band of material just before the roller-pressing of the flanks by suitable pads (42).

The functions of the roller-pressing pads are firstly to bond the roller-pressed band on the preform and secondly to flare this band when the section to be adopted has, on at least one of the wings of the section, a variation in the radius of curvature along the width of said wing. To this end they apply a pressure substantially normal to the surface of the preform to the band, for the bonding effect, which pressure, when combined with the friction of the pad in a direction substantially parallel to the preform's longitudinal axis, produces the flaring effect.

The width of the pad is preferably small and the contact between the pad and the preform is preferably realized using a deformable material.

After roller-pressing the band, the preform is cooled by blowing cold air (33) and calibrated during this cooling by applying a normal pressure to all its sides. The calibration elements (51, 52) are in the form of hard plates pressed against the sides of the preform.

Figure 2:
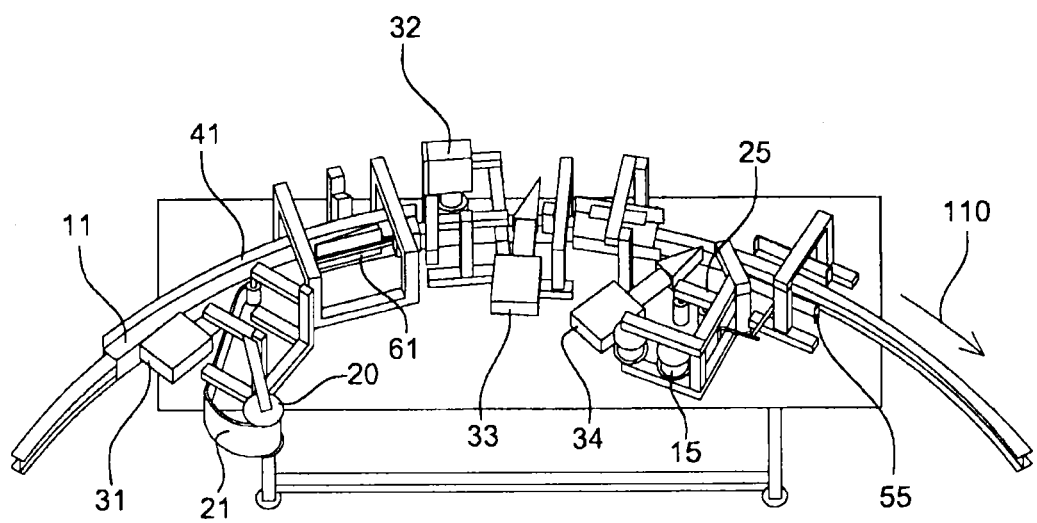
FIG. 2 shows a top view of the layup device in perspective.

FIG. 2, according to one embodiment, the depositing device is fixed and the punch (11) is mobile, following a trajectory (110) substantially parallel to its longitudinal axis. Alternatively, the relative movement of the punch and of the depositing device can be obtained by a fitted punch and a depositing device mounted on a carrier that is mobile in relation to this punch, or even by the combination of the two movements.

According to a particular embodiment, the depositing device comprises means (25, 15) for depositing unidirectional reinforcement tapes (25), whose fibers are oriented substantially parallel to the longitudinal axis of the preform. These fibers are deposited on the wings of the preform, which have no variation of radius of curvature along their width.

According to this embodiment, the depositing device comprises an additional heating device (34) able to activate the small amount of binding agent included in the unidirectional reinforcement bands (25); these are then pressed and calibrated by plate calibration elements (55).

Figure 3:
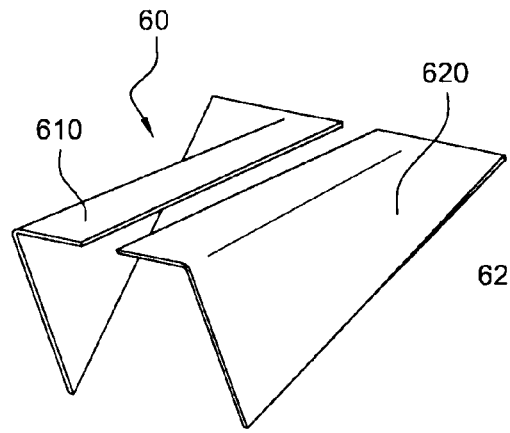
FIG. 3 illustrates an embodiment in perspective of the preforming channel designed for U-shaped cross-sections.
Figure 4:
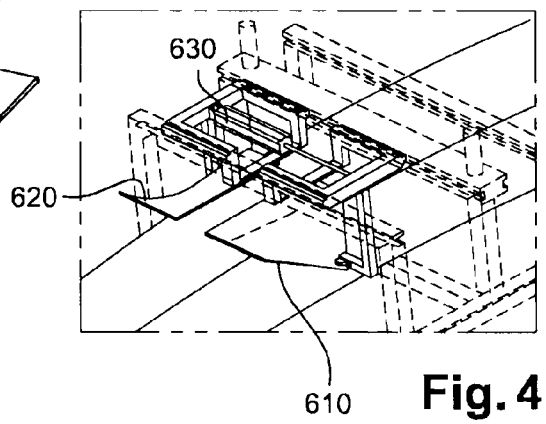
FIG. 4 is a perspective view of the device used to adjust the preforming channel along the section of the preform.

The low tack of fiber bands, called "dry", means it is not possible to make them adopt two non-coplanar surfaces simultaneously without risk of sliding and therefore of incorrect positioning of said band. The preforming channel (60), FIG. 3, allows the edges of the band to be gradually brought closer to the flanks of the preform, after said band has been roller-pressed and therefore immobilized on one of the preform's sides. Advantageously, said channel is in two parts (610, 620), disjointed in relation to a normal plane of symmetry perpendicular to the longitudinal axis of the preform. FIG. 4, these two portions (610, 620) of the channel can be brought closer or farther from each other using an actuator (630) or a spring.

Figure 5:
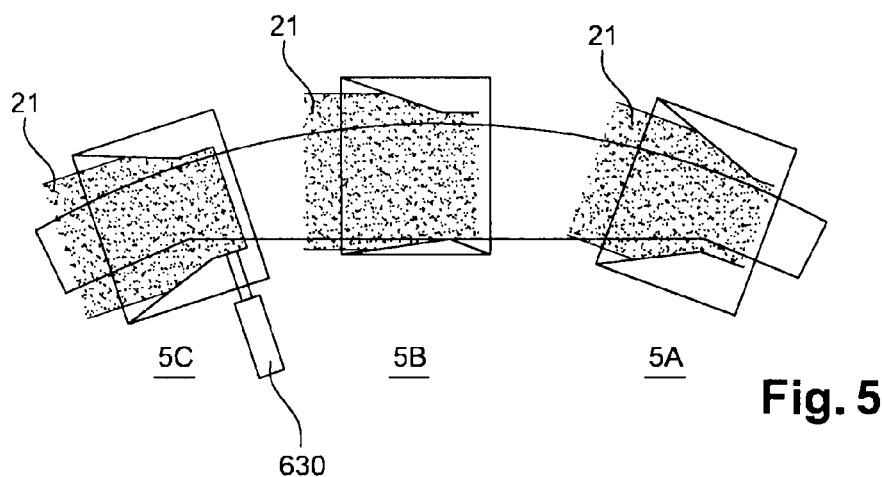
FIG. 5 is a top view showing the progress of the action of the preforming channel (FIG. 5A thru 5C) when the band is being deposited on the preform.

FIG. 5, this arrangement allows the action of said channel to be adjusted in the case in which the preform has variations of section.

Figure 6:
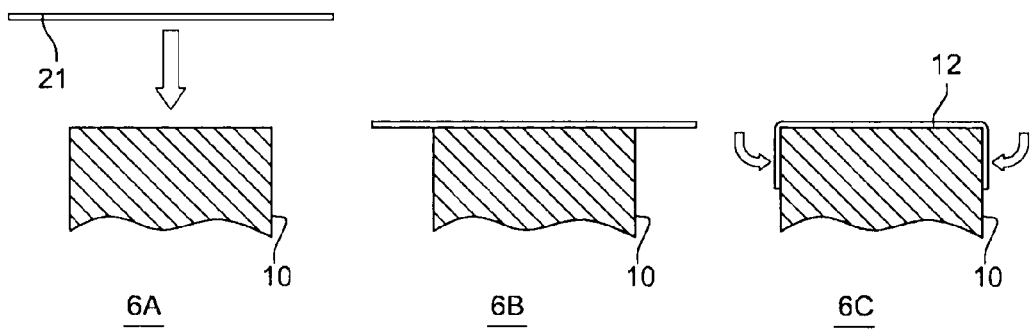
FIG. 6 is a cross-section view of the sequential application (FIG. 6A thru 6B) of a fibrous band on the preform according to an embodiment that corresponds to a U-shaped cross-section.

FIG. 6, in the example of realization of a U-shaped section, the band of fibrous material (21) is pressed against and roller-pressed onto the upper surface of the preform (12) after activating the interface by blowing hot air, FIGS. 6A and 6B, then the edges of the band (21) are folded over the flanks of the preform (12), FIG. 6C. FIG. 7, the blanks are then roller-pressed simultaneously by roller-pressing pads (410, 420). These comprise an interface pad (440) preferably made of an elastomeric material able to withstand the roller-pressing temperature and an element to apply the pressure (430) controlled as to force, typically consisting of a gas actuator. The roller-pressing pads are relatively narrow and the deformability of the interface pad is sufficient to adjust their shape to the local curvature of the preform. For special applications (angles, shoulders) the section of the pad can be adjusted to the shape.

The technical effect of the roller-pressing pads is to apply a normal and tangential pressure, the latter by friction, so as to bind the band onto the preform and to realize its flaring; this is why the pressure application elements (430) are controlled as to their force. The force applied by the pads on the preform is controlled by closed-loop control of the means of applying pressure, commonly by controlling the supply pressure of the gas actuators. The relative intensity of the friction is controlled by the stiffness and the type of the interface pad. In addition the interface pad can receive a coating to modify its friction characteristics and improve their resistance to wear, e.g. a coating based on fluorinated ethylene. Typically, for the same type of interface, the greater the pad's application force, the more deformable the interface pad is and the higher the tangential pressure on the band and on the preform will be. Suitable combinations are determined by tests.

FIG. 8, the calibration is realized during the cooling of the preform by applying pressure on all sides, using rigid plates (501, 502, 503) moved by means (530) such as actuators or ball-screws controlled in position. The control in position is realized using the information collected by copying sensors (560) which locate the punch (10) within the machine's space. Calibrating during cooling allows the theoretical thickness of the preform to be determined, taking into account the nature of the plies and the amount of binding agent deposited, but without taking the expansion effects of the binding agent into account. Since the position of the punch is known from information supplied by the copying sensor (560), the position of the calibration plates is determined by subtracting the theoretical thickness of the preform (12) from this position.

The information delivered by the copying sensors is also used to center the means of depositing of the band (20) in relation to the preform and to control the relative movement of the two portions (610, 620) of the preforming channel.

FIG. 8B, the angles are calibrated to their theoretical radius by strips (510) linked to the upper calibration plate (503) and whose action is sensitive essentially during the depositing of the last plies. The upper calibration plate is wider than the preform. The compensating strips (510) of the radii may take the form of continuous strips that reproduce said preform's curvature. Said strips may also be in the form of multiple short segments that are, in that case, straight and positioned tangentially in relation to the curvature. Said segments are then fixed in grooves made on the edges of the upper calibration plate and their radial position is adjusted by using the punch (10) as a template.

The shape of the lateral calibration plates matches the curvature of the preform.

FIG. 9, according to a preferred embodiment, when the radius of curvature of said parts is large enough, the lateral calibration plates are realized using plane plates (511-517) made of a hard material such as steel, connected by hinged joints whose axis is parallel to the longitudinal curvature axis of the preform. The plates are pressed onto the preform using one or more actuators (530) connected to said plates by articulated spreaders (540). In this way, the plates adjust to the effective curvature of the preform. Less thick, flexible steel plates are used when the radius of curvature is too small, which can adjust to the curvature of the part under the effect of the contact pressure.

If necessary, the calibration plates may be coated to improve their resistance to wear or to change their properties of friction with the preform.

Figure 10:
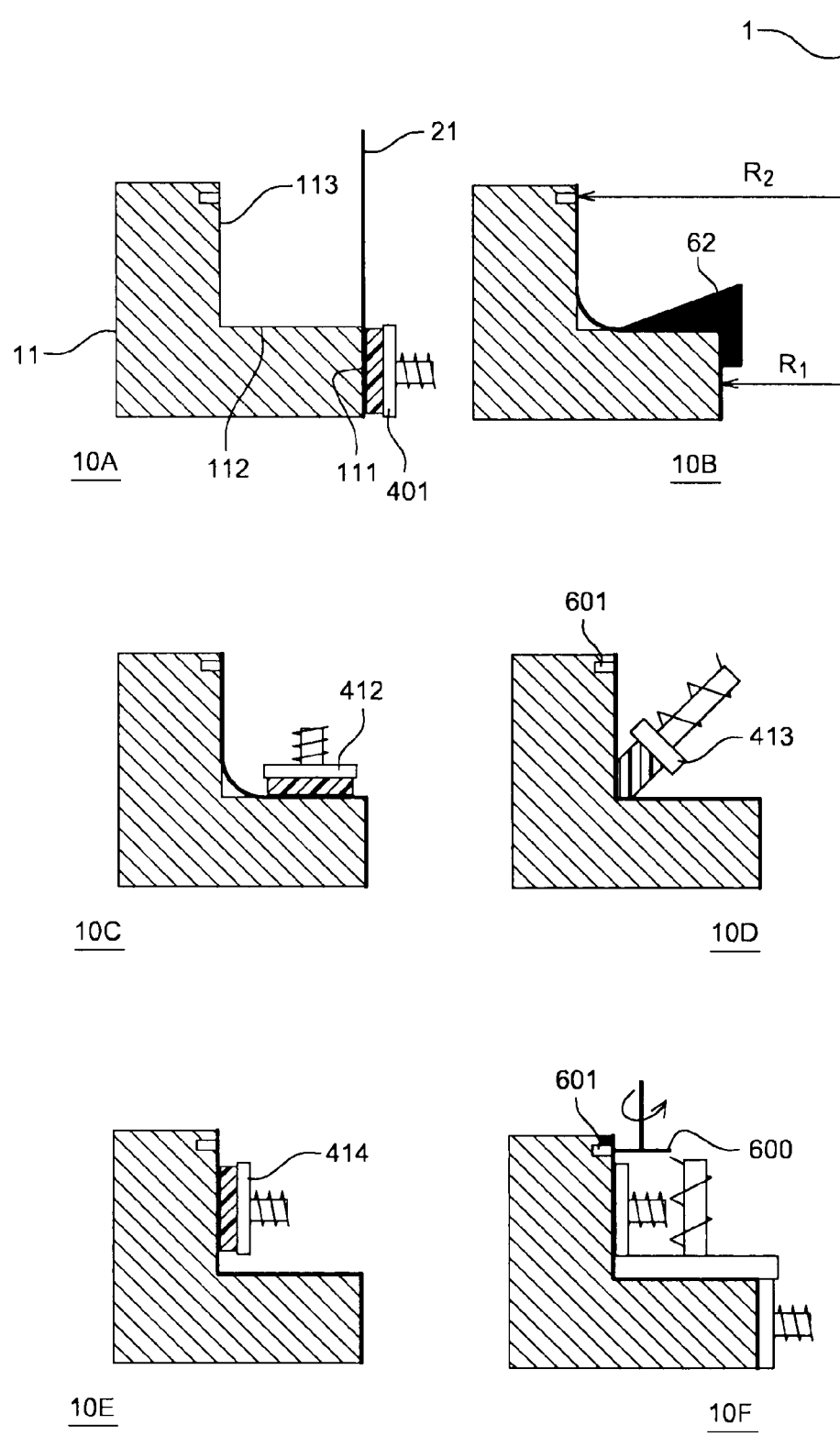
FIG. 10 illustrates in cross-section the steps (FIG. 10A thru 10F) for depositing a section of band along a section of Z-shaped profile.

FIG. 10, according to an example of realization of a curved preform whose section is substantially Z-shaped, the band of material (21) is first applied onto whichever side (111) of the punch (11) or of the preform presents the smallest radius of curvature. FIG. 10B, the band of material is then folded over towards the other sides, using the preforming channel (61). The portion of band that is applied on the side (112) with a variation of radius of curvature along its width is roller-pressed with a roller-pressing pad (412), FIG. 10C. In addition to pressing said band (21) against the preform, this roller-pressing pad realizes the flaring of the preform. A specific roller-pressing pad (413), FIG. 10D, allows the flaring of the band (21) to be completed in the re-entrant angle of the section. The roller-pressing is completed by the passage of a pad (414) on the side (113) with the largest radius of curvature (R2). FIG. 10F, the calibration is performed on all the sides during the cooling of the preform.

All these operations are realized simultaneously on different portions of the preform, during the relative movement between the punch and the depositing device.

Cooling is achieved by blowing air at ambient temperature or cooled air, either directly onto the preform or through the punch or by a combination of both. The thermal heating/cooling cycle determines the speed of the relative movement and thereby the productivity of the device. To this end it is useful to minimize the thermal inertia of the punch (10, 11) to speed up both the heating and cooling. The punch is therefore advantageously made of a perforated material such as a folded perforated sheet or a grille folded into the shape of the punch, which grille is covered in release fabric that facilitates demolding, such as glass cloth, before laying up. This glass cloth prevents the preform from sticking to the tool and can easily be torn off said preform before the resin injection/infusion process.

Since the punch is perforated and the preform is porous, the cooling is accelerated by blowing cold air through the punch and the preform. This arrangement also allows the cooling to be realized at the same time that the calibration plates are applied on the preform, thus improving the calibration of said preform.

Figure 11:
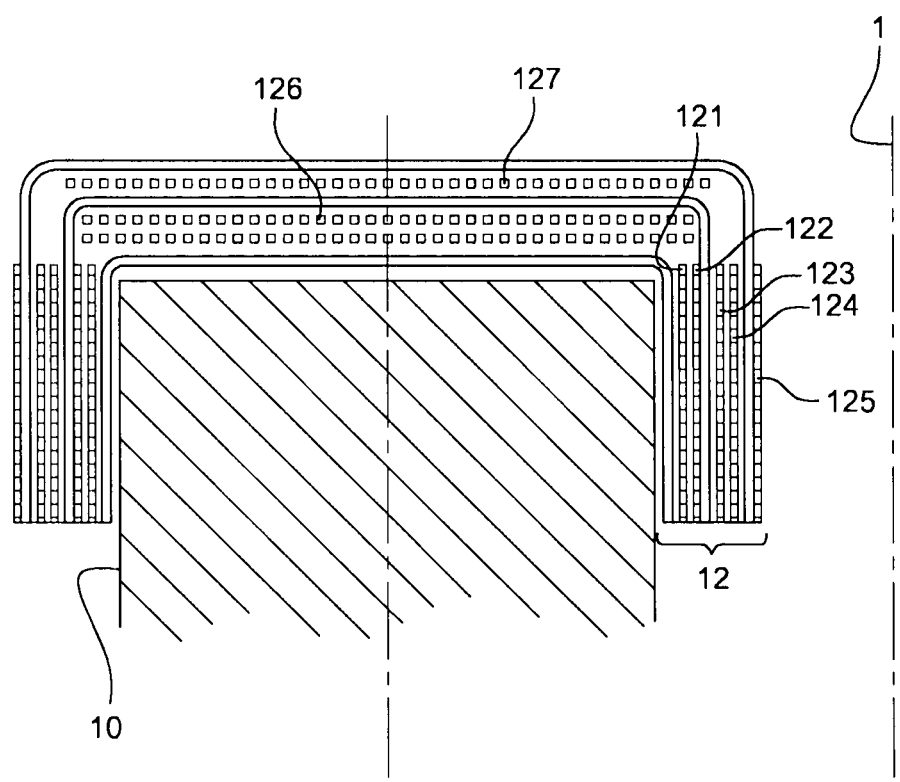
FIG. 11 is an example in cross-section of stratification of a section according to an embodiment of the invention.

FIG. 11, the device allows complex stackings to be deposited, comprising for example:

triaxial layers −30°, 90°, +30° or +30°, 90°, −30° (121, 123, 125)

between which uni-axial reinforcements are inset at 0° (122, 124, 126, 127)

The uni-axial reinforcements located on the upper surface of the preform (127, 126), which surface has a variation of the radius of curvature along its width are deposited in narrow bands of 4 to 6 mm wide, for example by a method of dry fiber placement.

Advantageously, at the end of the depositing operation or simultaneously with it, just after the calibration operation, cutting means (600) allow the wings to be finished at the two extremities of the section. These cutting means are made of a thumbwheel (600) that runs in a groove (601) made in the sides (111, 113) of the mandrel opposite said wings of the preform.

The above description clearly illustrates that through its various features and their advantages the present invention realizes the objectives it set itself. In particular, it allows circular dry preforms to be manufactured in an automated and repeatable manner. The repeatability of the method and the use of dry fiber, allow parts comprising fiber fractions higher than 60% by mass to be obtained. Such fiber fractions, which are impossible to achieve with the techniques of the prior state of the art, allow, for equal mass, the mechanical characteristics of these parts to be increased or, for equal mechanical characteristics, allow their mass to be reduced, which is particularly advantageous for the aeronautics field.

The invention claimed is:
1. A device for laying up a dry preform having an elongated shape, the device comprising:

a punch that reproduces the elongated shape of the dry preform;
a depositing assembly including
a reel that deposits a fibrous band onto the punch, the fibrous band including a small amount of binding agent to make up the dry preform having a cross-section with at least two non-coplanar wings,
a first pressing device that presses the deposited fibrous band against one side of the punch to immobilize the deposited fibrous band on one side of the dry preform,
a channel that pre-shapes the immobilized fibrous band to have the cross-section with the at least two non-coplanar wings,
a heater that heats a portion of the immobilized fibrous band to activate the small quantity of binding agent,
a second pressing device that presses the portion of the immobilized fibrous band, while hot, against a surface of the punch, to shape the immobilized fibrous band into the cross-section with the at least two non-coplanar wings, and
a calibration device that applies a normal pressure to all surfaces of the dry preform that are opposite from the punch while cooling the pressed portion of the fibrous band to control a thickness of the dry preform having the cross-section with the at least two non-coplanar wings; and
at least one mobile carrier that moves at least one of the punch and the depositing assembly.

2. The device according to claim 1, wherein the channel further comprises:
two separate parts that can move in relation to each other; and
a channel part moving apparatus that moves at least one of said two separate parts to adapt a preforming cross-section shape to shape variations in the punch or the dry preform.

3. The device according to claim 1, wherein the punch is made of a porous or perforated material.

4. The device according to claim 3, further comprising:
a cooling device able to cool the preform by blowing heat transfer fluid through the punch.

5. The device according to claim 1, wherein the depositing assembly further includes roller-pressing pads having a contact surface with the preform that is elastic and deformable under the action of a contact pressure.

6. The device according to claim 1, wherein the calibration device includes pads having articulated plates.

7. The device according to claim 1, further comprising:
a punch location sensor able to determine a location of a section of the punch during the relative movement of the punch in relation to the depositing assembly.

8. The device according to any one of claims 1 to 7, wherein:
the punch is of substantially circular shape;
the punch is fitted on a mobile table;
the depositing assembly is held in a fixed position; and
the mobile table moves the punch below the depositing assembly to control a longitudinal tension in the deposited fibrous band.

9. The device according to claim 1, wherein the dry preform is porous and includes less than 5% of the binding agent.

* * * * *